United States Patent
Reina

(10) Patent No.: US 7,414,958 B2
(45) Date of Patent: Aug. 19, 2008

(54) EFFICIENT TONE ORDERING FOR MULTITONE TRANSMISSION

(75) Inventor: Guy Reina, Givatayim (IL)

(73) Assignee: STMicroelectronics Ltd., Netanya (IL)

( * ) Notice: Subject to any disclaimer, the term of this patent is extended or adjusted under 35 U.S.C. 154(b) by 850 days.

(21) Appl. No.: 10/969,442

(22) Filed: Oct. 20, 2004

(65) Prior Publication Data

US 2005/0213718 A1 Sep. 29, 2005

Related U.S. Application Data

(60) Provisional application No. 60/557,820, filed on Mar. 29, 2004.

(51) Int. Cl.
*H04J 11/00* (2006.01)
*H04L 5/12* (2006.01)
*H04L 23/02* (2006.01)

(52) U.S. Cl. .................. 370/203; 370/207; 370/208; 370/210; 375/265

(58) Field of Classification Search ........... 370/203, 370/207, 208, 210, 484, 494
See application file for complete search history.

(56) References Cited

U.S. PATENT DOCUMENTS

| | | | |
|---|---|---|---|
| 5,495,483 A | | 2/1996 | Grube et al. |
| 5,774,500 A | * | 6/1998 | Zogakis et al. ............... 375/261 |
| 6,084,886 A | * | 7/2000 | Dehner et al. ................ 370/458 |
| 7,088,781 B2 | * | 8/2006 | Betts ........................... 375/260 |
| 7,269,209 B2 | * | 9/2007 | Peeters ........................ 375/222 |
| 7,272,193 B2 | * | 9/2007 | Fwu ............................. 375/265 |
| 2001/0042235 A1 | | 11/2001 | Djokovic et al. |
| 2003/0039306 A1 | * | 2/2003 | Redfern ....................... 375/222 |

OTHER PUBLICATIONS

Section 8.6 of ITU-U Recommendation G.992.3, entitled Series G: Transmission Systems and Media, Digital Systems and Networks: Digital Sections and Digital Line System—Access Networks; Asymmetric Digital Subscriber Line Transceivers 2 (ADSL2), International Telecommunication Union, Jul. 2002.

* cited by examiner

*Primary Examiner*—Melvin Marcelo
*Assistant Examiner*—Farah Faroul
(74) *Attorney, Agent, or Firm*—Darby & Darby

(57) ABSTRACT

A method for data communication includes providing an order for assigning bits of an input data stream to tones in a multi-tone modulation scheme, and allocating respective bit-loading values to the tones, such that some of the tones are allocated a first bit-loading value and other tones are allocated at least one second bit-loading value. The order is modified so as to form pairs of the tones that are allocated the first bit-loading value, with one or more of the other tones intervening between at least some of the pairs. The input data stream is modulated by assigning the bits to the tones in accordance with the modified order and the respective bit-loading values, and encoding the bits that are assigned to each of the pairs of the tones as a constellation point.

24 Claims, 3 Drawing Sheets

EFFICIENT TONE ORDERING FOR MULTITONE TRANSMISSION

CROSS-REFERENCE TO RELATED APPLICATION

This application claims the benefit of U.S. Provisional Patent Application 60/557,820, filed Mar. 29, 2004, which is incorporated herein by reference.

FIELD OF THE INVENTION

The present invention relates generally to high-speed digital communication systems, and specifically to methods for transmission and reception of multi-tone signals with variable tone order.

BACKGROUND OF THE INVENTION

Discrete multi-tone (DMT) modulation is used in many types of data communication systems, among them multi-carrier Very-high-speed Digital Subscriber Line (VDSL) modems, as well as Asymmetric DSL (ADSL). In these systems, N tones (also known as subcarriers) are modulated by QAM two-dimensional input frequency-domain symbols. A 2N-point Inverse Fast Fourier Transform (IFFT) then produces a corresponding time-domain symbol, expressed as a real baseband time-domain output signal of 2N real samples in each symbol period. At the receiving side, 2N samples are extracted from the time-domain signal during each symbol period. A FFT is used to demodulate the signal and recover the original QAM symbols on the N tones.

The number of bits to be encoded by each tone, known as the bit loading (or bit allocation), is determined by the receiver according to the line conditions, which are measured as a function of frequency during a training period. The bit-loading value for each tone may take any value from zero up to a preset maximum. The receiver passes a table of these values, known as the bit-loading table (or bit allocation table), to the transmitter, which thus determines how many bits of the input data stream to allocate to each successive tone in the tone order.

In some schemes, the transmitter simply encodes the tones in order of frequency. More advanced schemes, however, permit the receiver to determine the tone order arbitrarily. For example, the receiver may choose an interleaved tone order so that successive bits in the input data stream are carried by tones that are relatively far apart in frequency. Interleaved tone ordering may be combined with trellis coding for purposes of forward error correction, in order to prevent data loss due to narrowband interference. A scheme of this sort may be used, for example, in ADSL2 systems, as described in section 8.6 of ITU-T Recommendation G.992.3, entitled *Series G: Transmission Systems and Media, Digital Systems and Networks; Digital Sections and Digital Line System—Access Networks; Asymmetric Digital Subscriber Line Transceivers 2 (ADSL2)* (International Telecommunication Union, 2002), which is incorporated herein by reference. According to this scheme, the receiver determines a tone-order table listing the tones in the order in which they are to be encoded, and passes this table to the transmitter along with the bit-loading table.

The trellis coding scheme that is mandated by the above-mentioned ADSL2 standard uses a 16-state, four-dimensional trellis code, which accepts two-dimensional constellation points as inputs. In other words, each input to the trellis encoder must be at least two bits. The ADSL2 standard therefore requires that the bit-loading table include an even number of one-bit tones (i.e., tones i whose bit loading $B(i)=1$), and that these one-bit tones be grouped together at the end of the tone order. For this purpose, the transmitter must reorder the tone table that it received from the receiver to generate a reordered tone table with all the one-bit tones at the end of the table. The one-bit tones are then paired to form two-dimensional constellation points as input to the trellis encoder. The bit-loading table is reordered in accordance with the reordered tone table.

SUMMARY OF THE INVENTION

Storing the tone-order table and bit-loading table requires substantial memory resources, and the process of reordering the tables to group one-bit tones together can be computation-intensive and time-consuming. Not only must this reordering process be carried out at start-up, but it must also be repeated if the bit loading changes subsequently (due to a change in line conditions, for example). Whereas ADSL uses at most 256 subcarrier tones, VDSL is designed for transmission on up to 4096 tones, making the problems of memory use and computational load that are associated with tone reordering proportionally more severe.

Embodiments of the present invention address these problems by providing more efficient solutions for tone reordering in order to group tones of a given bit loading, such as one-bit tones. In these embodiments, the tone-order table is reordered by finding and putting together pairs of one-bit tones within the tone order, rather than grouping all the one-bit tones together as in methods known in the art. Each such pair of one-bit tones can then be encoded as a constellation point input to an encoder.

Typically, the first member of each pair is shifted in the tone order by the minimum distance necessary to reach the position immediately adjacent to the second member. The second member need not be shifted at all. In this manner, the tone-order table is put into a form suitable for encoding using the minimum possible number of position shifts, thus minimizing the computational burden of tone reordering. Implementation of this scheme in ADSL2, for example, would require certain changes to the tone ordering protocol defined in the standard, but in return provides a useful tone reordering with reduced memory requirements and reduced computational burden.

In some embodiments of the present invention, the tone reordering is computed on the fly, in the course of scanning the original tone-order table and assigning data bits to each tone in the order. Only one pass over the table is needed for this purpose. Thus, it is possible to store only the original tone-order table, and compute the new tone ordering—at both the transmit and receive ends of the communication link—for each time-domain symbol depending on the current bit-loading values.

Alternatively, the reordered tone table can be stored in place of the original tone-order table at the transmit and receive ends of the communication link. In such embodiments, there is no need to save the previous tone-order table or to pass reordering instructions from the transmitter to the receiver. In the event of a subsequent change in bit loading, both the transmitter and receiver can use the saved, reordered tone table as the basis for computing new reordered tone tables based on the new bit-loading values.

There is therefore provided, in accordance with an embodiment of the present invention, a method for data communication, including:

providing an order for assigning bits of an input data stream to tones in a multi-tone modulation scheme;

allocating respective bit-loading values to the tones, such that some of the tones are allocated a first bit-loading value and other tones are allocated at least one second bit-loading value;

modifying the order so as to form pairs of the tones that are allocated the first bit-loading value, with one or more of the other tones intervening between at least some of the pairs; and modulating the input data stream by assigning the bits to the tones in accordance with the modified order and the respective bit-loading values, and encoding the bits that are assigned to each of the pairs of the tones as a constellation point.

In disclosed embodiments, the first bit-loading value is one bit per tone, and encoding the bits includes encoding the bits as a two-dimensional constellation point. In one embodiment, modulating the input data stream includes generating a time-domain signal for transmission in accordance with a Digital Subscriber Line (DSL) standard, and encoding the bits includes determining trellis codes in compliance with the standard.

In some embodiments, each of the pairs includes first and second tones, and modifying the order includes shifting a position in the order of the first tone in each of the pairs, without shifting the second tone. Typically, shifting the position includes scanning over the tones in the order until the first tone is found, continuing to scan over the tones in the order subsequent to the first tone until the second tone is found, and while continuing to scan over the tones, swapping the position of the first tone with the tones subsequent to the first tone until the first tone is adjacent to the second tone in the order. In a disclosed embodiment, modulating the data stream includes encoding the bits that are assigned to the first and second tones while scanning over the tones in the order subsequent to the second tone.

In some embodiments, the method includes storing the modified order, wherein allocating the respective bit-loading values includes changing the bit-loading values after storing the modified order, and wherein modifying the order includes operating on the modified order responsively to the changed bit-loading values in order to determine a new order for assigning the bits to the tones.

There is also provided, in accordance with an embodiment of the present invention, apparatus for transmitting bits of an input data stream on a plurality of tones in accordance with a multi-tone modulation scheme, the apparatus including a transmitter, which includes:

a tone-order controller, which is coupled to receive an order for assigning the bits of the input data stream to the tones and to receive respective bit-loading values that are allocated to the tones, such that some of the tones are allocated a first bit-loading value and other tones are allocated at least one second bit-loading value, and which is adapted to modify the order so as to form pairs of the tones that are allocated the first bit-loading value, with one or more of the other tones intervening between at least some of the pairs; and an encoder, which is adapted to modulate the input data stream by assigning the bits to the tones in accordance with the modified order and the respective bit-loading values, and to encode the bits that are assigned to each of the pairs of the tones as a constellation point.

In disclosed embodiments, the apparatus includes a receiver, which is adapted to convey a tone-order table to the tone-order controller, wherein the transmitter is adapted to transmit the modulated input data stream as a signal over a communication link to the receiver. Typically, the receiver is adapted to transmit the respective bit-loading to the transmitter. In some embodiments, both the controller in the transmitter and the receiver are adapted to determine the modified order, wherein the receiver is adapted to demodulate the signal responsively to the modified order without transmission of the modified order from the transmitter to the receiver. Typically, both the transmitter and the receiver are adapted to store the tone-order table, and to compute the modified order on the fly based on the stored tone-order table, without storing the modified order.

The present invention will be more fully understood from the following detailed description of the embodiments thereof, taken together with the drawings in which:

DETAILED DESCRIPTION OF EMBODIMENTS

Figure 1:
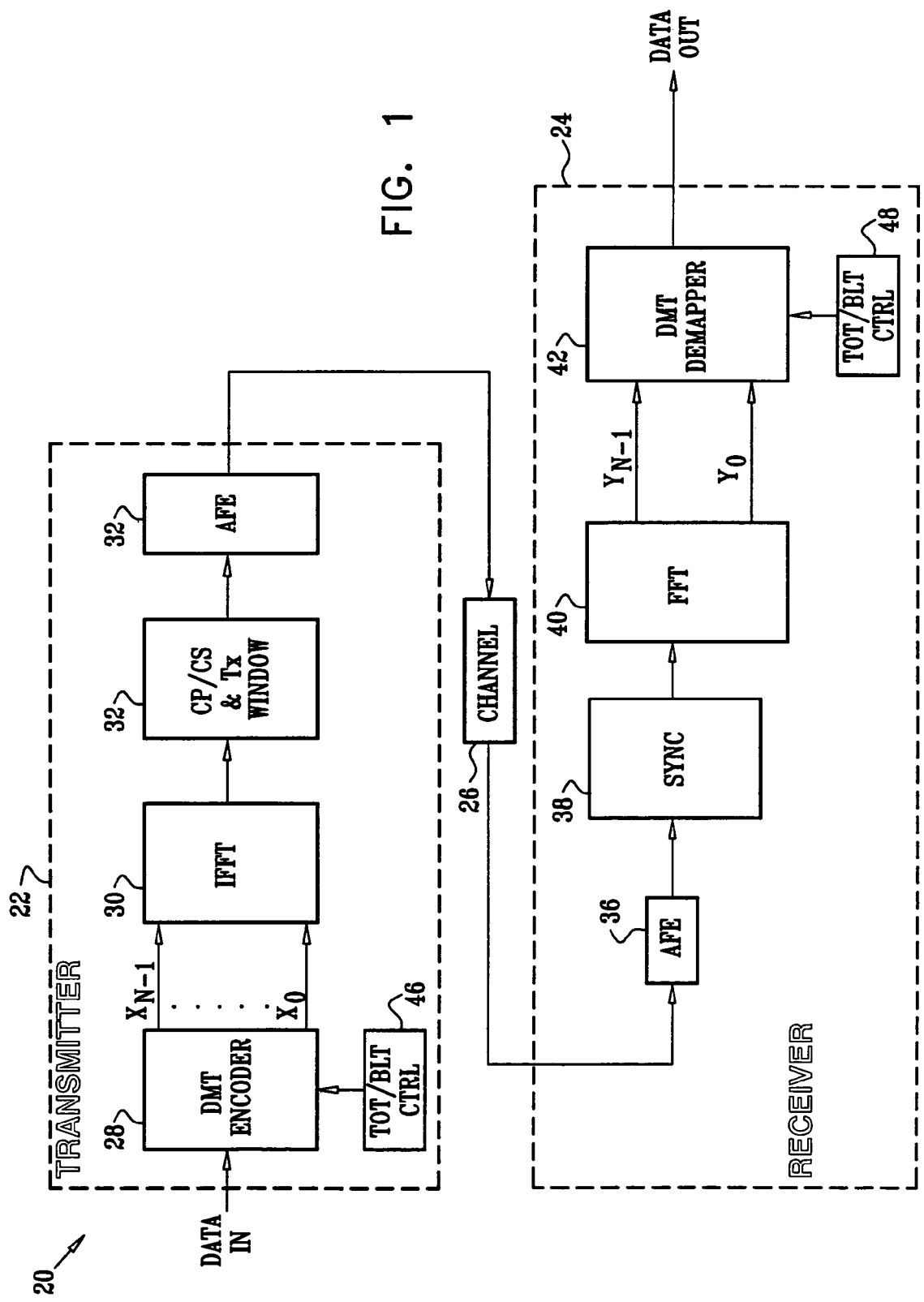
FIG. 1 is a block diagram that schematically illustrates a DMT communication system, in accordance with an embodiment of the present invention.

FIG. 1 is a block diagram that schematically illustrates a DMT communication system 20, in accordance with an embodiment of the present invention. In this exemplary embodiment, it will be assumed for the sake of convenience and clarity of illustration that system 20 operates in accordance with the ADSL2 standard cited above, although the present invention is by no means limited in its applicability to systems of this specific type. For example, the principles embodied in system 20 may be applied in VDSL communications, as well as in other multi-tone transmission schemes.

System 20 comprises a transmitter 22, which transmits DMT signals to a receiver 24 over a channel 26. Typically, channel 26 comprises a bi-directional link, but the additional transmitter and receiver that are used for reverse-direction transmission are omitted here for the sake of simplicity. For this same reason, the figures in the present patent application show only those elements of transmitter 22 and receiver 24 that are useful to understanding the operation of the present invention. The additional elements required for a complete implementation of system 20 will be apparent to those skilled in the art. The elements of transmitter 22 and receiver 24 that are shown in the figures may be implemented using either hard-wired or programmable components, or a combination of different component types. Although for reasons of conceptual clarity, the figures show the transmitter and receiver as comprising certain functional blocks, in actual implementations these blocks may be combined into a single circuit component, or their functions may be divided among several different circuit components, as will be apparent to those skilled in the art.

Transmitter 22 comprises a DMT encoder 28, which receives a stream of digital input data. The encoder modulates the data onto an array of tones 0 through N−1, thus generating frequency-domain symbols $X_0$ through $X_{N-1}$. The order of the tones to which the input bits are assigned and the number of bits allocated to each tone are determined in accordance with a tone-order table (TOT), T, and bit-loading table (BLT), B, held by a transmit TOT/BLT controller 46, in accordance with tone reordering procedures described hereinbelow. An IFFT circuit 30 converts the symbols into a time-domain symbol comprising a sequence of 2N real digital samples. A cyclic extender 32 adds a cyclic extension to each time-domain symbol, thus defining a data block, and may also apply a transmit window to each block. An analog front end (AFE) 34 converts the digital samples to analog signals for transmission over channel 26.

The signals are received by an AFE 36 in receiver 24, which converts the signals to a time-domain sequence of digital samples. A synchronization circuit 38 recovers the symbol timing in the equalized sample stream and thus finds the samples corresponding to the time-domain symbol within each data block. The samples corresponding to the time-domain symbol are input to a FFT circuit 40, typically of length 2N, which generates an array of complex frequency-domain samples $Y_0$ through $Y_{N-1}$. A demapper 42 then recovers the transmitted data by demodulating each of the tones. The demapper uses the tone order given by the TOT/BLT, as indicated by a receive TOT/BLT controller 48, in determining the order in which to serialize the output data from the different tones.

At start-up of system 20, controller 48 determines the tone order and passes the TOT to controller 46. The controllers cooperate in determining the bit loading for each tone using a suitable training procedure, such as those described in the applicable ADSL and VDSL standards. When the BLT includes one-bit tones, controllers 46 and 48 reorder the TOT so as to form adjoining pairs of one-bit tones, using procedures described hereinbelow. As these procedures are deterministic (given the contents of the BLT and the original TOT), each of the controllers can independently calculate the reordered TOT, and there is no need for one side to communicate the reordered table to the other. When conditions on channel 26 mandate changes in the bit loading, controller 48 calculates the new bit-loading values and passes the values to controller 46. To the extent that the updated BLT includes any new one-bit tones or converts the bit loading of former one-bit tones to other values, controllers 46 and 48 reorder the TOT accordingly to pair all the one-bit tones. This reordering uses the same deterministic algorithm as the initial reordering, and therefore can again be calculated independently by each of the controllers.

Figure 2:
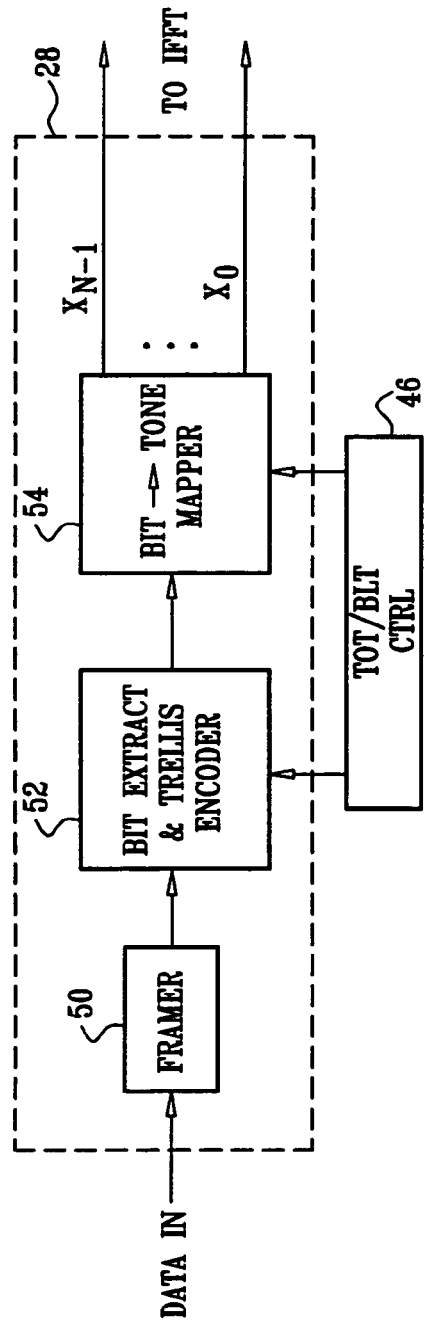
FIG. 2 is a block diagram that schematically shows details of a DMT encoder, in accordance with an embodiment of the present invention.

FIG. 2 is a block diagram that schematically shows details of DMT encoder 28, in accordance with an embodiment of the present invention. Here again, for the sake of simplicity, elements that are not needed for an understanding of the present invention are omitted from the figure. A framer 50 forms successive frames of input data bits, each frame corresponding to one time-domain symbol that is to be generated by IFFT circuit 30. An encoder 52 extracts the bits in sequence from framer 50 and encodes sequential groups of the bits in accordance with a trellis code. It is assumed here that the trellis code accepts as input two-dimensional constellation points, as mandated by the above-mentioned ADSL2 standard, for example. Encoder 52 determines exactly how many bits to extract for each constellation point depending on the succession of bit-loading values supplied by TOT/BLT controller 46. The controller determines the order of the bit-loading values depending on the TOT order, which is modified, as described in detail hereinbelow, so that one-bit tones appear only in pairs. Thus, encoder 52 extracts bits from framer 50 at least two bits at a time.

Encoder 52 outputs a sequence of multi-bit trellis codes to a bit/tone mapper 54. The mapper uses the trellis codes to modulate the tones in the order indicated by controller 46. Each tone is modulated with a frequency-domain symbol determined by the corresponding trellis code generated by encoder 52 and the allocated bit-loading of the tone. Mapper 54 determines the number of bits to map to each tone depending on the bit-loading values supplied by controller 46. After the appropriate frequency-domain symbols have been modulated on all tones, mapper 54 outputs the entire spectrum of tones to IFFT circuit 30.

Figure 3:
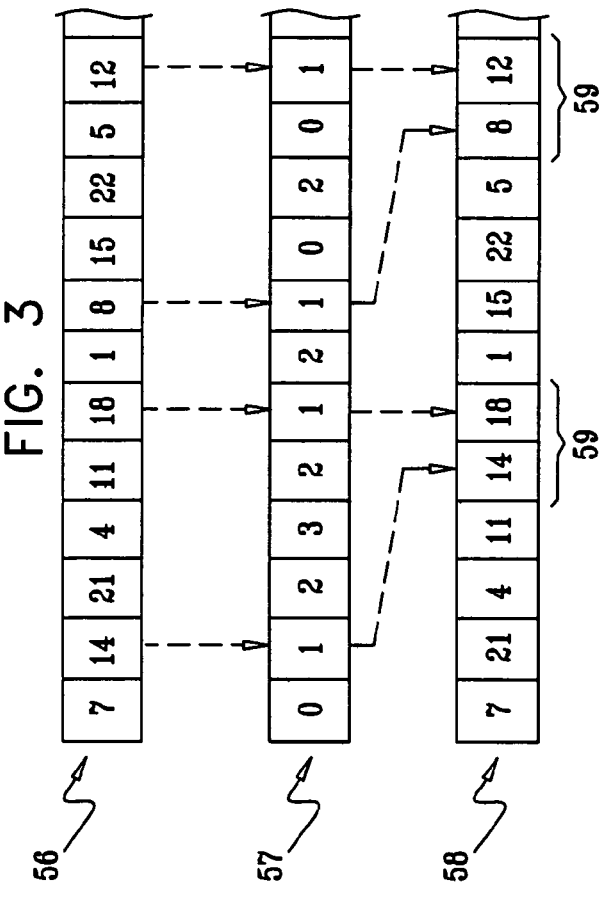
FIG. 3 is a block diagram that schematically illustrates tone order and bit-loading tables, in accordance with an embodiment of the present invention.

FIG. 3 is a block diagram that schematically illustrates an exemplary tone reordering scenario, in accordance with an embodiment of the present invention. The figure shows a tone-order table 56, with entries T(n), wherein n is the tone order index and T(n) is the tone index (or tone number) of the n-th tone to be encoded. In the example shown in FIG. 3, T(0)=7, T(1)=14, T(2)=21, and so forth, meaning that encoder 52 is to assign the first bit or bits provided by framer 50 to tone 7, followed by tone 14, then tone 21, etc. A bit-loading table 57 indicates the number of bits to be allocated to each tone, wherein i is the tone index and B(i) is the loading of the tone with tone index i. In the implementation shown in FIG. 3, the entries in bit-loading table 57 are ordered not according to i, but rather according to T(i), so that the bit-loading value for each tone appears immediately below the position of that tone in tone-order table 56.

Based on these two tables, controllers 46 and 48 generate a modified tone-order table 58, with entries T'(k). The new table is ordered according to the following rules:

$$T'(k) = T(n), \text{ wherein} \quad [\text{equation (1)}]$$

$$k = \begin{cases} n-1 & (\text{num\_lower}(n, M) \text{ is odd}) \\ & \text{and } (n \text{ not in } M) \\ M(\text{find\_index}(n, M) + 1) - 1 & n \text{ in } M (0:2:\text{end}) \\ n & \text{otherwise} \end{cases}$$

Here M(t) is a vector of the positions in T(n) of tones with one-bit loading. M(t) is ordered in ascending order, with M(0) being the first element of the vector. Thus, in the example shown in FIG. 3, M(0)=1, M(1)=5, M(2)=7, and so forth, indicating the positions of tones 14, 18, 8, etc., in table 56. The function find_index(a,B) returns the position (index) in the vector B of the entry a (i.e., a=B(find_index(a,B))). The function num_lower(a,B) returns the number of entries in B that are lower than a. This function is used in equation (1) to distinguish between the first and second members of each pair of one-bit entries. The notation M(0:2:end) stands for all even entries of M (i.e., entries with even indices).

As can be seen in FIG. 3, the result of this reordering is to form pairs 59 of one-bit tones in modified table 58. The first tone in each pair, such as tone 14 or tone 8, is shifted back in the order until it reaches the second tone, which is not shifted. Other tones, with different bit-loading values, intervene between pairs 59. This scheme minimizes the number of shifts that must be performed in order to pair all the one-bit tones, and thus minimizes the computational burden involved in tone reordering. Zero-bit tones (such as tones 7 and 15) may be left in place in table 58, as shown in FIG. 3, or they may alternatively be shifted to the end of the order.

Note that the order of table 58 is fully and uniquely determined by tables 56 and 57. Therefore, once controllers 46 and 48 have computed table 58, they can store the reordered table in memory and discard table 56. If changes occur in bit-loading table 57 thereafter, the procedure represented by equation (1) may simply be repeated using table 58 and the new bit-loading values in table 57 to generate a new tone-order table. (For efficiency in such a case, controller 48 may simply communicate the changes in the bit-loading table to controller 46, rather than conveying the entire table of bit-loading values.) Alternatively, only original tone-order table 56 may be stored in memory, and the new tone order for each time-domain symbol may be calculated on the fly by controllers 46 and 48. An exemplary procedure for on-the-fly computation of the tone ordering is described below with reference to FIG. 4. Further alternatively, both the original and modified tone-order tables may be saved in memory.

Although FIG. 3 shows certain exemplary data structures for holding the tone order and bit-loading data, other data structures may equivalently be used and are considered to be within the scope of the present invention. For example, the tone order may be held in a table of the form V(t), wherein t is the tone index (i.e., the tone number), and V(t) is the position of the tone in the tone order. As another example, the tones may be held in a linked list L(n), together with the tone index of the first tone to encode, wherein L(n) is the tone index of the next tone to encode after tone n. Similarly, the bit-loading table may be sorted according to the tone-order table, as shown in FIG. 3, or stored together with the tone-order table in another form.

The reordering procedure represented by equation (1) may be implemented in many different ways, all of which are considered to be within the scope of the present invention. For example, Listing 1 below comprises sample pseudo-code demonstrating one possible method of implementation, in which the old table entries B(T(i)) are replaced with the new, reordered entries:

---
LISTING 1

```
Move1Bit = false
for i = 0 to N-1
    if (Move1Bit)
        if (B(T(i)) == 1)
            Move1Bit = false
        Else
            Swap(T(i),T(i-1))
        end
    else if (B(T(i)) == 1)
        Move1Bit = true
End
```
---

Controllers 46 and 48 may use the method represented by Listing 1 in calculating and storing reordered table 58.

Figure 4:
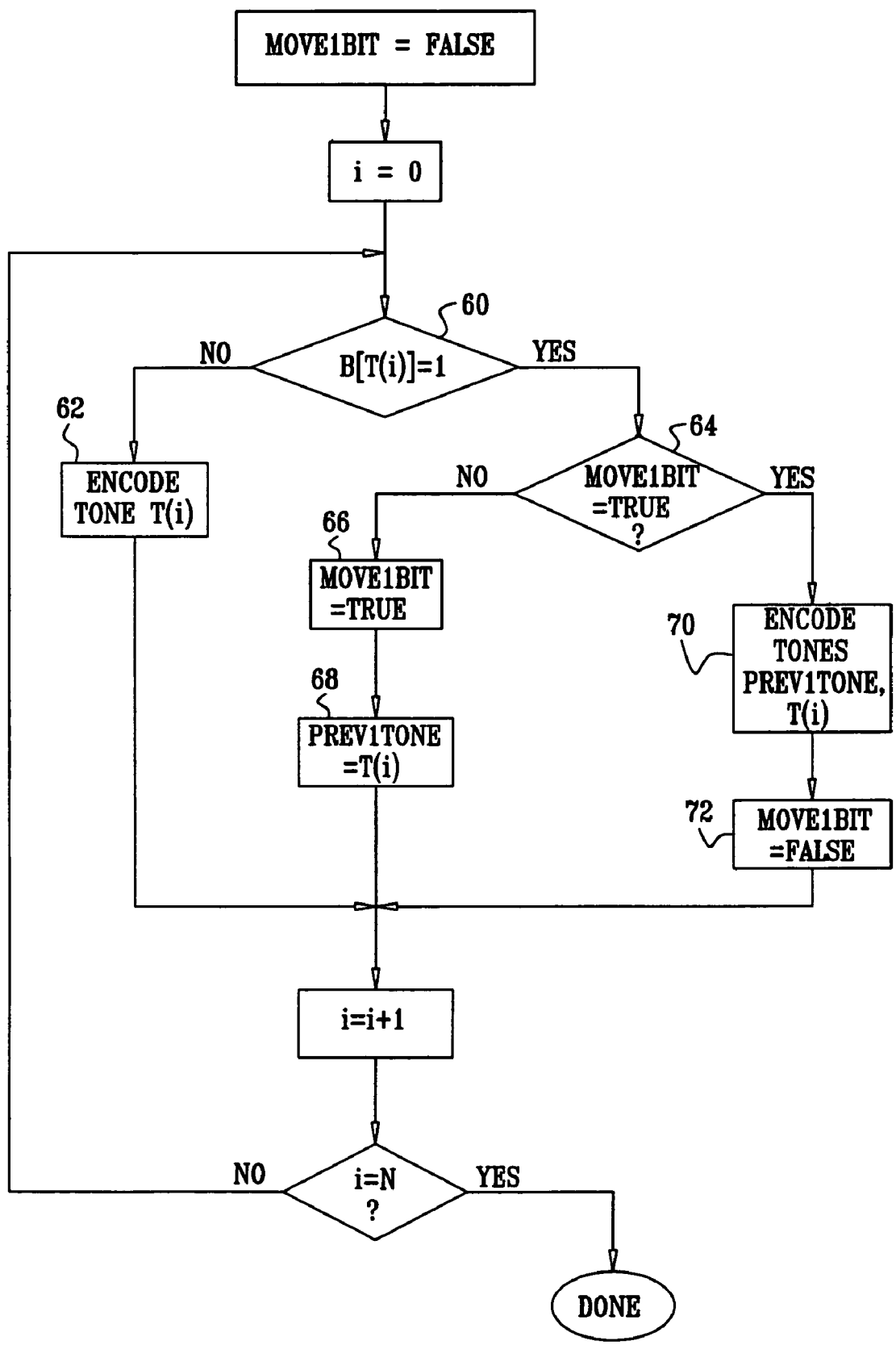
FIG. 4 is a flow chart that schematically illustrates a method for tone reordering, in accordance with an embodiment of the present invention.

FIG. 4 is a flow chart that schematically illustrates another method for tone reordering, in accordance with an embodiment of the present invention. This method can be carried out on the fly, as encoder 52 reads out and encodes the bits and passes the trellis codes on to mapper 54 for modulation. It may thus be carried out either by a separate controller 46, as shown in FIG. 2, or by a controller embedded in encoder 52. The method of FIG. 4 can run independently, using the original tone-order table as input, or it may be combined with another, static computation method, such as that shown in Listing 1, in order to perform reordering on the fly while calculating the modified tone-order table for storage in memory and subsequent use.

Initially, the logical variable Move1Bit is set to the value "false," and the tone order index i is set to zero. Controller 46 (separate or embedded in encoder 52, as noted above) scans over successive entries B(T(i)) from bit-loading table 57, according to the order of the tones T(i) in tone-order table 56, at a bit-load checking step 60. As long as the bit-loading of the current tone is not equal to one, encoder 52 simply reads out and encodes the appropriate number of bits for tone T(i), at a single-tone encoding step 62. The controller then moves on to the next tone in the tone-order table, with index i+1.

If the current tone is found at step 60 to be a one-bit tone, however, the controller next checks the value of Move1Bit, at a status checking step 64. If the value is false, it means that the current one-bit tone is to be the first member of the next pair of one-bit tones to be formed. In this case, the value of Move1Bit is set to true, at a status setting step 66. The current tone index T(i) is placed in a temporary variable Prev1Tone, at a number saving step 68. The encoder then continues to scan over the succeeding tones in the tone order.

When Move1Bit is found to be true at step 64, it means that a previous one-bit tone index has been saved and is waiting in Prev1Tone. In this case, encoder 52 extracts and encodes a pair of bits, for modulation as a two-dimensional constellation point for the pair of tones Prev1Tone and T(i), at a pair encoding step 70. Move1Bit is then reset to the value false, at a status reset step 72. The controller continues iterating through the remaining tones in this manner until it reaches the end of the tone-order table and all the tones have thus been appropriately modulated.

Although the above methods for pairing one-bit tones are based on shifting the position of the first tone in each pair, in alternative embodiments of the present invention, other shift algorithms may be used to pair the one-bit tones. For example, rather than shifting the first tone in each pair back in the tone order, the second tone in the pair may be moved forward, or both tones in the pair may be shifted. Whereas the methods described above relate specifically to forming pairs of one-bit tones, these methods may easily be adapted to efficient grouping of tones having other, predetermined bit-loading values.

Furthermore, although embodiments of the present invention are described hereinabove with reference to system 20, and specifically to characteristics of ADSL and VDSL communication methods and standards, the principles of the present invention may also be applied, mutatis mutandis, to other multi-tone transmission schemes with variable bit loading and tone order. It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for data communication, comprising:
providing an order for assigning bits of an input data stream to tones in a multi-tone modulation scheme;
allocating respective bit-loading values to the tones, wherein some of the tones are allocated a first bit-loading value and other tones are allocated at least one second bit-loading value;
modifying the order to form pairs of the tones that are allocated the first bit-loading value, with one or more of the other tones intervening between at least some of the pairs; and
modulating the input data stream by assigning the bits to the tones in accordance with the modified order and the respective bit-loading values, and encoding the bits that are assigned to each of the pairs of the tones as a constellation point.

2. The method according to claim 1, wherein the first bit-loading value is one bit per tone, and wherein encoding the bits comprises encoding the bits as a two-dimensional constellation point.

3. The method according to claim 2, wherein modulating the input data stream comprises generating a time-domain signal for transmission in accordance with a Digital Subscriber Line (DSL) standard, and wherein encoding the bits comprises determining trellis codes in compliance with the DSL standard.

4. The method according to claim 1, wherein each of the pairs comprises first and second tones, and wherein modifying the order comprises shifting a position in the order of the first tone in each of the pairs, without shifting the second tone.

5. The method according to claim 4, wherein shifting the position comprises:
scanning over the tones in the order until the first tone is found;
continuing to scan over the tones in the order subsequent to the first tone until the second tone is found; and
while continuing to scan over the tones, swapping the position of the first tone with the tones subsequent to the first tone until the first tone is adjacent to the second tone in the order.

6. The method according to claim 5, wherein modulating the data stream comprises encoding the bits that are assigned to the first and second tones while scanning over the tones in the order subsequent to the second tone.

7. The method according to claim 1, wherein providing the order comprises conveying a tone-order table from a receiver to a transmitter, and comprising transmitting the modulated input data stream as a signal over a communication link from the transmitter to the receiver.

8. The method according to claim 7, wherein allocating the respective bit-loading values comprises conveying a bit-loading table from the receiver to the transmitter.

9. The method according to claim 7, wherein modifying the order comprises determining the modified order at both the transmitter and the receiver, and comprising receiving and demodulating the signal at the receiver responsively to the modified order without transmitting the modified order from the transmitter to the receiver.

10. The method according to claim 9, and comprising storing the tone-order table at both the transmitter and the receiver, and wherein determining the modified order comprises computing the modified order based on the stored tone-order table.

11. The method according to claim 10, wherein computing the modified order comprises calculating the modified order on the fly without storing the modified order.

12. The method according to claim 1, and comprising storing the modified order, wherein allocating the respective bit-loading values comprises changing the bit-loading values after storing the modified order, and wherein modifying the order comprises operating on the modified order responsively to the changed bit-loading values in order to determine a new order for assigning the bits to the tones.

13. Apparatus for transmitting bits of an input data stream on a plurality of tones in accordance with a multi-tone modulation scheme, the apparatus comprising a transmitter, which comprises:
a tone-order controller, which is coupled to receive an order for assigning the bits of the input data stream to the tones and to receive respective bit-loading values that are allocated to the tones, wherein some of the tones are allocated a first bit-loading value and other tones are allocated at least one second bit-loading value, and which modifies the order to form pairs of the tones that are allocated the first bit-loading value, with one or more of the other tones intervening between at least some of the pairs; and
an encoder, which modulates the input data stream by assigning the bits to the tones in accordance with the modified order and the respective bit-loading values, and to encode the bits that are assigned to each of the pairs of the tones as a constellation point.

14. The apparatus according to claim 13, wherein the first bit-loading value is one bit per tone, and wherein the encoder encodes the bits that are assigned to each of the pairs as a two-dimensional constellation point.

15. The apparatus according to claim 14, and comprising transmission circuitry, which generates a time-domain signal for transmission in accordance with a Digital Subscriber Line (DSL) standard, wherein the encoder encodes the bits using trellis codes in compliance with the DSL standard.

16. The apparatus according to claim 13, wherein each of the pairs comprises first and second tones, and wherein the controller shifts a position in the order of the first tone in each of the pairs, without shifting the second tone.

17. The apparatus according to claim 16, wherein the controller scans over the tones in the order until the first tone is found, to continue scanning over the tones in the order subsequent to the first tone until the second tone is found, and while continuing to scan over the tones, to swap the position of the first tone with the tones subsequent to the first tone until the first tone is adjacent to the second tone in the order.

18. The apparatus according to claim 17, wherein the encoder encodes the bits that are assigned to the first and second tones while the controller scans over the tones in the order subsequent to the second tone.

19. The apparatus according to claim 13, and comprising a receiver, which conveys a tone-order table to the tone-order controller, wherein the transmitter transmits the modulated input data stream as a signal over a communication link to the receiver.

20. The apparatus according to claim 19, wherein the receiver transmits the respective bit-loading to the transmitter.

21. The apparatus according to claim 19, wherein both the controller in the transmitter and the receiver determine the modified order, wherein the receiver demodulates the signal responsively to the modified order without transmission of the modified order from the transmitter to the receiver.

22. The apparatus according to claim 21, wherein both the transmitter and the receiver store the tone-order table, and compute the modified order based on the stored tone-order table.

23. The apparatus according to claim 22, wherein the transmitter and the receiver compute the modified order on the fly without storing the modified order.

24. The apparatus according to claim 13, wherein the controller stores the modified order in a memory, and upon receiving a change in the bit-loading values after storing the modified order, operates on the modified order responsively to the changed bit-loading values in order to determine a new order for assigning the bits to the tones.

* * * * *